United States Patent
Gal et al.

(10) Patent No.: US 11,798,256 B2
(45) Date of Patent: *Oct. 24, 2023

(54) SYSTEMS AND METHODS FOR DOCUMENT IMAGE ANALYSIS WITH CARDINAL GRAPH CONVOLUTIONAL NETWORKS

(71) Applicant: WAY2VAT LTD., Tel-Aviv (IL)

(72) Inventors: Rinon Gal, Tel-Aviv (IL); Roy Shilkrot, Kibbutz Negba (IL); Amos Simantov, Hod Hasharon (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/562,046

(22) Filed: Dec. 27, 2021

(65) Prior Publication Data
US 2022/0122368 A1    Apr. 21, 2022

Related U.S. Application Data

(63) Continuation of application No. 17/059,482, filed as application No. PCT/IB2020/055478 on Jun. 11, 2020, now Pat. No. 11,238,277.

(60) Provisional application No. 62/862,078, filed on Jun. 16, 2019.

(51) Int. Cl.
| | |
|---|---|
| G06K 9/00 | (2022.01) |
| G06K 9/46 | (2006.01) |
| G06K 9/62 | (2022.01) |
| G06V 10/44 | (2022.01) |
| G06V 30/414 | (2022.01) |
| G06F 18/20 | (2023.01) |
| G06V 30/19 | (2022.01) |
| G06V 10/82 | (2022.01) |

(52) U.S. Cl.
CPC ......... *G06V 10/454* (2022.01); *G06F 18/29* (2023.01); *G06V 10/82* (2022.01); *G06V 30/19173* (2022.01); *G06V 30/414* (2022.01)

(58) Field of Classification Search
None
See application file for complete search history.

(56) References Cited

U.S. PATENT DOCUMENTS

| | | | | |
|---|---|---|---|---|
| 10,885,325 B2 * | 1/2021 | Yamazaki | ............ | G06V 30/414 |
| 10,956,765 B2 * | 3/2021 | Nishimura | ............ | G06F 3/0488 |
| 2015/0339572 A1 * | 11/2015 | Achin | .................... | G06N 20/00 |
| | | | | 706/46 |

(Continued)

FOREIGN PATENT DOCUMENTS

CN    108388651 A  *  8/2018  ......... G06F 16/353

*Primary Examiner* — Randolph I Chu
(74) *Attorney, Agent, or Firm* — ALPHAPATENT ASSOCIATES, LTD; Daniel J. Swirsky

(57) ABSTRACT

Systems and methods for processing documents based on a cardinal graph convolution network by generating cardinal graph representations representing words as single nodes with edges connected between neighbouring nodes in four cardinal directions. Features tensors are generated for nodes of the cardinal graph representation and the cardinal directions are encoded to generate an adjacency tensor having node neighbour indices. Entries of the adjacency tensor are transformed into a one-hot encoding of the node neighbour indices. Neighbourhood feature tensors are created over node indices and the features in each block may be scaled, convolved and reduced into new feature tensors.

9 Claims, 7 Drawing Sheets

(56) References Cited

U.S. PATENT DOCUMENTS

2017/0034593 A1* 2/2017 Ray .................. H04N 21/812
2018/0189269 A1* 7/2018 Quirk ................. G06F 16/243

* cited by examiner

| Field | Sequential LSTM | Visual Linguistic | GCN | BERT | CGCN-Full |
|---|---|---|---|---|---|
| B-TotalAmount | 0.842 | 0.707 | 0.270 | 0.508 | 0.835 |
| I-TotalAmount | 0.297 | 0.159 | 0.120 | 0 | 0.486 |
| B-Date | 0.717 | 0.687 | 0.274 | 0.496 | 0.767 |
| I-Date | 0.127 | 0.121 | 0.036 | 0.045 | 0.160 |
| B-TotalLabel | 0.651 | 0.674 | 0.187 | 0.625 | 0.698 |
| I-TotalLabel | 0.518 | 0.623 | 0.044 | 0.400 | 0.603 |
| B-VatLabel | 0.764 | 0.743 | 0.220 | 0.739 | 0.779 |
| I-VatLabel | 0.116 | 0.163 | 0 | 0 | 0.162 |
| B-VatAmount | 0.754 | 0.593 | 0.341 | 0.481 | 0.782 |
| I-VatAmount | 0.028 | 0 | 0 | 0 | 0.256 |
| B-VatID | 0.556 | 0.583 | 0.058 | 0.586 | 0.646 |
| I-VatID | 0.560 | 0.310 | 0.173 | 0.313 | 0.689 |
| B-Phone | 0.634 | 0.623 | 0.150 | 0.673 | 0.762 |
| I-Phone | 0.594 | 0.579 | 0.301 | 0.691 | 0.838 |

| Field | CGCN-Full | CGCN-NoPool | CGCN-DirOnly | CGCN-WithMeta |
|---|---|---|---|---|
| B-TotalAmount | 0.835 | 0.789 | 0.760 | 0.730 |
| I-TotalAmount | 0.486 | 0.417 | 0.346 | 0.396 |
| B-Date | 0.767 | 0.754 | 0.748 | 0.726 |
| I-Date | 0.160 | 0.198 | 0.113 | 0.077 |
| B-TotalLabel | 0.698 | 0.690 | 0.684 | 0.635 |
| I-TotalLabel | 0.603 | 0.617 | 0.663 | 0.608 |
| B-VatLabel | 0.779 | 0.739 | 0.784 | 0.720 |
| I-VatLabel | 0.162 | 0.210 | 0.158 | 0.101 |
| B-VatAmount | 0.782 | 0.777 | 0.786 | 0.726 |
| I-VatAmount | 0.256 | 0.202 | 0.095 | 0 |
| B-VatID | 0.646 | 0.644 | 0.538 | 0.650 |
| I-VatID | 0.689 | 0.724 | 0.699 | 0.664 |
| B-Phone | 0.762 | 0.710 | 0.689 | 0.709 |
| I-Phone | 0.838 | 0.802 | 0.772 | 0.729 |

Fig. 5

| Field | Raw | | | | Normalized | | | |
|---|---|---|---|---|---|---|---|---|
| | Sequential LSTM | Visual Linguistic | GCN | CloGCN-Full | Sequential LSTM | Visual Linguistic | GCN | CloGCN-Full |
| Total Amount | 0.400 | 0.699 | 0.648 | 0.750 | 0.501 | 0.857 | 0.794 | 0.920 |
| Date | 0.324 | 0.580 | 0.562 | 0.620 | 0.397 | 0.711 | 0.690 | 0.700 |
| Vat ID | 0.050 | 0.285 | 0.000 | 0.322 | 0.061 | 0.350 | 0.000 | 0.425 |
| Phone | 0.092 | 0.214 | 0.000 | 0.347 | 0.112 | 0.262 | 0.000 | 0.395 |

Fig. 6

SYSTEMS AND METHODS FOR DOCUMENT IMAGE ANALYSIS WITH CARDINAL GRAPH CONVOLUTIONAL NETWORKS

CROSS-REFERENCE TO RELATED APPLICATIONS

This application is a continuation of U.S. patent application Ser. No. 17/059,482, filed Nov. 30, 2020, which is a National Phase Application under 35 U.S.C. 371 of International Application No. PCT/IB IB2020/055478, which has an international filing date of Jun. 11, 2020, and which claims priority and benefit from U.S. Provisional Patent Application No. 62/862,078, filed Jun. 12, 2020 the contents of all of which are incorporated by reference in their entirety.

FIELD AND BACKGROUND OF THE DISCLOSURE

The disclosure herein relates to systems and methods for image based document analysis. In particular the disclosure relates to Graph Convolutional Networks (GCN) for processing pseudo-spatial graph representations of the underlying structure of documents.

The task of information extraction from documents has long been one of the fundamental problems in natural language processing. The goals of information extraction systems are varied, ranging from business expense tracking to automated resume analysis, assisted information retrieval from websites for the visually impaired and more. A common thread uniting many information extraction tasks is that the textual data at hand is arranged in a clear spatial manner, where directional relationships between the objects on the document can provide information crucial to the success of the task. One example of such a relationship can be found in receipts, where the detection of the total sum of the invoice can be assisted by its proximity and spatial relation ('right of', 'under') to words with specific semantic meaning, such as 'Total' or 'Amount due'. A commonly proposed solution for information extraction tasks is the use of a recurrent neural network (RNN), such as an LSTM, where document objects are arranged in some arbitrary manner (often left-to-right and topto-bottom) and fed into the network. When working with documents embedded in 2D images, a canonical approach is to use convolutional neural networks (CNNs) that intrinsically model neighborhood relationships between pixels with convolutions. Other solutions choose to eschew the ordering requirement in favor of graph neural networks (GNNs), and graph convolutional networks (GCNs) in particular, which are able to maintain knowledge of each object's vicinity by treating each object as a node in the graph, and connecting the neighbours by edges. GCN based solutions are generally invariant to the permutations of the graph's nodes, ensuring the graph automorphisms are maintained. This property ensures that the GCN will output the same result for a given graph, regardless of the a-priori ordering of the nodes, for which there is often no clear reading order. Vanilla GCNs, however, lose knowledge of the directional relationship between the nodes, a trait which can be crucial in the extraction process.

RELATED WORKS

A short overview on the key role of the graphical approach to document analysis in recent times is described below. However, document analysis, on its multitude of applications, spans much farther and wider than just graphical approaches.

Classical methods. Application of graphical methods to document analysis is a long standing practice. The early INFORMSys system (Cesarini et al., 1998) already suggested utilizing spatial relationships between elements in the document embedded in a graph in order to extract information. Following this realization, more early graphical methods for document analysis, and information extraction (IE) in particular, focused on layout graph matching: matching a sub-graph vs. a given pattern that embodies the required piece of information and its surroundings. Graph matching received a great deal of attention with application towards field extraction (Liang and Doermann, 2002; Hamza et al., 2007; Hassan, 2009), and (Gallagher, 2006) offer an earlier survey of this domain.

Machine learning. Later incarnations of document IE have turned towards machine learning. While some methods did not employ graphs (Esposito et al., 2008; Cesarini et al., 2003), others have continued the previous graphical approach only with application of statistical inference. (Hamza et al., 2008) incrementally improved their previous system by using an Incremental Growing Neural Gas neural network for graph matching, and (Bart and Sarkar, 2010) suggested graph "wrapping" with a probabilistic approach.

Contemporary methods. While not strictly comprehensive, (Cristani et al., 2018) offer a good overview of contemporary document IE systems and their evolution. Advances in machine learning and the availability of annotated data gave birth to an abundance of methods and approaches utilizing spatial information, both with and without specific graph representation. (Rusinol et al., 2013)'s earlier field extraction system utilizing cardinal "star graph" around nodes and graph matching, was succeeded by (Santosh, 2015)'s "graph mining" approach that utilized a 3_3 node neighborhood at a far bigger scale of data.

Deep neural networks. The rise of deep neural networks revolutionized the way features and representation were being learned from the data, forgoing handcrafted features and shallow inference in favor of deep hierarchical abstraction. Works combining visual image and textual features were offered (Katti et al., 2018; Gal et al., 2018) utilizing convolutional networks as well as recurrent networks (Palm et al., 2017), looking to classify the position of the required information from the document. Very recently, marrying the ideas from deep neural networks and graphical neural networks (Wu et al., 2019) towards IE, (Liu et al., 2019) have proposed a method that extracts a large amount of information from the document both structural (e.g. tables, sections) and semantic (e.g. fields) using graph convolutional networks.

Graph convolutional networks (GCNs). GCNs (Kipf and Welling, 2016) are an incarnation of graph neural networks (GNNs) that use convolutions (linear transformations) to hierarchically learn node features from one layer to another in a feed-forward neural network. GCNs define an undirected graph G=(A; F), where A is its adjacency matrix (A.M), F is the node-features matrix, and the diagonal degree matrix is denoted D. A convolutional operation in layer i aims to calculate a higher order embedding for the nodes, and is defined as:

$$F^{(i+1)} = \rho\left(D^{-\frac{1}{2}}\hat{A}D^{-\frac{1}{2}}F^{(i)}W^{(i)}\right), \quad (1)$$

where ρ is an activation, W are trainable weights and $\hat{A}=A+I$ is the self-loop augmented A.M. Applying the root inverse degree $D^{-1/2}$ is a regularization step that keeps the associated weights (and gradients) of low- or high-degree nodes from vanishing or exploding.

Pooling Layers in GCNs

The above formulation does not decrease or increase the size of the graph, or change its adjacency structure, which in turn limits the application of GCNs on very large graphs, since there is no reduction in the graph's spatial resolution. Furthermore, reductions in graph size are desirable for graph classification tasks, where the target is to assign a class to the entire graph. To that end, pooling operations for GNNs were suggested to reduce the number of nodes in subsequent layers. A thorough overview of GCNs and pooling in particular is given in (Wu et al., 2019). The DiffPool method (Ying et al., 2018) defines a pooling layer by learning an assignment $S^{(i)} \in R^{n_i \times n_{i+1}}$ from nodes of input layer i to nodes output layer i+1 (usually $n_i >> n_{i+1}$) using a GNN:

$$A^{(i+1)} = S^{(i)T} A^{(i)} S^{(i)} \quad (2)$$

$$S^{(i)} = \text{softmax}\left(GNN_{pool}(A^{(i)}, F^{(i)})\right), \quad (3)$$

where a softmax operation serves as a regularization for each node-to-node assignment to asymptotically strive to be a one-hot vector, driven by an entropy loss: $\mathcal{L}_E^{(i)} = H(S^{(i)})$ (H being the entropy). The features matrix $F^{(i+1)}$ is similarly transformed with the assignment and another trainable GNN. DiffPool also tries to maintain spatial coherence by encouraging neighbor nodes to cluster together with an additional target to minimize using a Frobenius inner-product: $\mathcal{L}_{LP}^{(i)} = \langle A^{(i)}, S^{(i)} S^{(i)T} \rangle F$.

While GCNs and DiffPool are powerful tools, they do not intrinsically model any spatial information beyond node adjacency. The geometric direction of nodes is not encoded anywhere in the mathematical formulation, so that information is lost in cases where it is important, such as document information extraction.

To address the lack of directional information in GCN models, a graph representation is proposed which encodes the spatial direction of neighbours, and a framework with which to apply convolutions and pooling operations on said representation.

SUMMARY OF THE EMBODIMENTS

It is a first aspect of the current invention to introduce a document analysis system operable to process a document based on a cardinal graph convolution network. The document analysis system may include elements such as an automatic document analyzer, a feature-harvesting agent, a neighbourhood analyzer, a feature-tensor generation agent, a pooling agent and the like.

In another aspect of the invention, a method for processing a document based on a cardinal graph convolution network is disclosed. The method may use the above elements of the document analysis system to perform steps of a method including generating a cardinal graph representation of the document, wherein in the cardinal graph representation each word in the document is represented as a single node on a graph and edges are connected between neighbouring nodes in four cardinal directions. The method further comprising generating a features tensor (F.T) for each node of the cardinal graph representation, the features tensor having a dimension of n×m, where n is the number of nodes in the cardinal graph representation and m is the features vector size. The method further comprising encoding the cardinal directions in a 3×3 neighborhood to generate an adjacency tensor (A.T) having node neighbour indices, the adjacency tensor (A.T) having a dimension of $n_l \times 3 \times 3$, where l is the number of layers in the (A.T) $n_l$ is the number of nodes in the layer.

Accordingly a document analysis system is introduced for processing a document, the document analysis system including an automatic document analyzer operable to generate the cardinal graph representation, a feature-harvesting agent for generating the features tensor, a neighbourhood analyzer for creating the neighborhood features tensors, a feature-tensor generation agent for convolving features of each block and reducing the convolved tensor into a new feature tensor, and a pooling agent operable to change the size of the graph where required.

In a further aspect of the invention, the method for processing the document comprises transforming the entries of the adjacency tensor (A.T) into a one-hot encoding $\widetilde{AT}$ of the node neighbour indices and creating a neighbourhood feature tensor (NFT) through an Einstein-summation over the node indices of the $\widetilde{AT}$ s one-hot encoding and the node indices of the features tensor (F.T) (204) using the equation:

$$NFT_{i,j,k,l} = \sum_a^{n_l} \widetilde{AT}_{i,j,k,a} FT_{a,l},$$

wherein neighbourhood feature tensor (NFT) having a dimension of $n_l \times 3 \times 3 \times m$ where each 3×3×m block is a local patch of features in the neighbourhood of each node.

In another aspect of the invention, the method for processing the document comprises scaling the features in each block by multiplying them with a connectivity weight tensor (C.W.T), wherein the connectivity weight tensor (C.W.T) encodes a weighting over the adjacency tensor (A.T) edges, convolving the scaled features in each block with K learnable kernels of dimension 3×3×m in $W^{(l)}$ resulting in a convolved tensor of $n_l \times 3 \times 3 \times K$ dimension; and reducing the convolved tensor into a new feature tensor of dimension $n_l \times K$ by selecting a center cell of the convolved tensor, wherein the center cell corresponds to a node's self-link in the adjacency tensor (A.T).

In yet another aspect of the invention, the method for processing the document comprises a pooling operation to change the size of a graph by reusing a cardinal convolution operation to learn mapping from layer l to l+1 of the adjacency tensor (A.T).

BRIEF DESCRIPTION OF THE FIGURES

For a better understanding of the embodiments and to show how it may be carried into effect, reference will now be made, purely by way of example, to the accompanying drawings.

With specific reference now to the drawings in detail, it is stressed that the particulars shown are by way of example and for purposes of illustrative discussion of selected embodiments only, and are presented in the cause of providing what is believed to be the most useful and readily understood description of the principles and conceptual aspects. In this regard, no attempt is made to show structural details in more detail than is necessary for a fundamental understanding; the description taken with the drawings making apparent to those skilled in the art how the various selected embodiments may be put into practice. In the accompanying drawings:

FIG. 5 is a table illustrating the F1 measures for all tagged IOB fields for the four baseline models (left) and for the four ablation study setups (right);

FIG. 6 is a table presenting highest-confidence-candidate accuracy for four invoice fields (post IOB chunking), showing both raw results (left) and values normalized to account only for images where the OCR managed to successfully read all four fields anywhere in the invoice (right)

DETAILED DESCRIPTION

Figure 1:
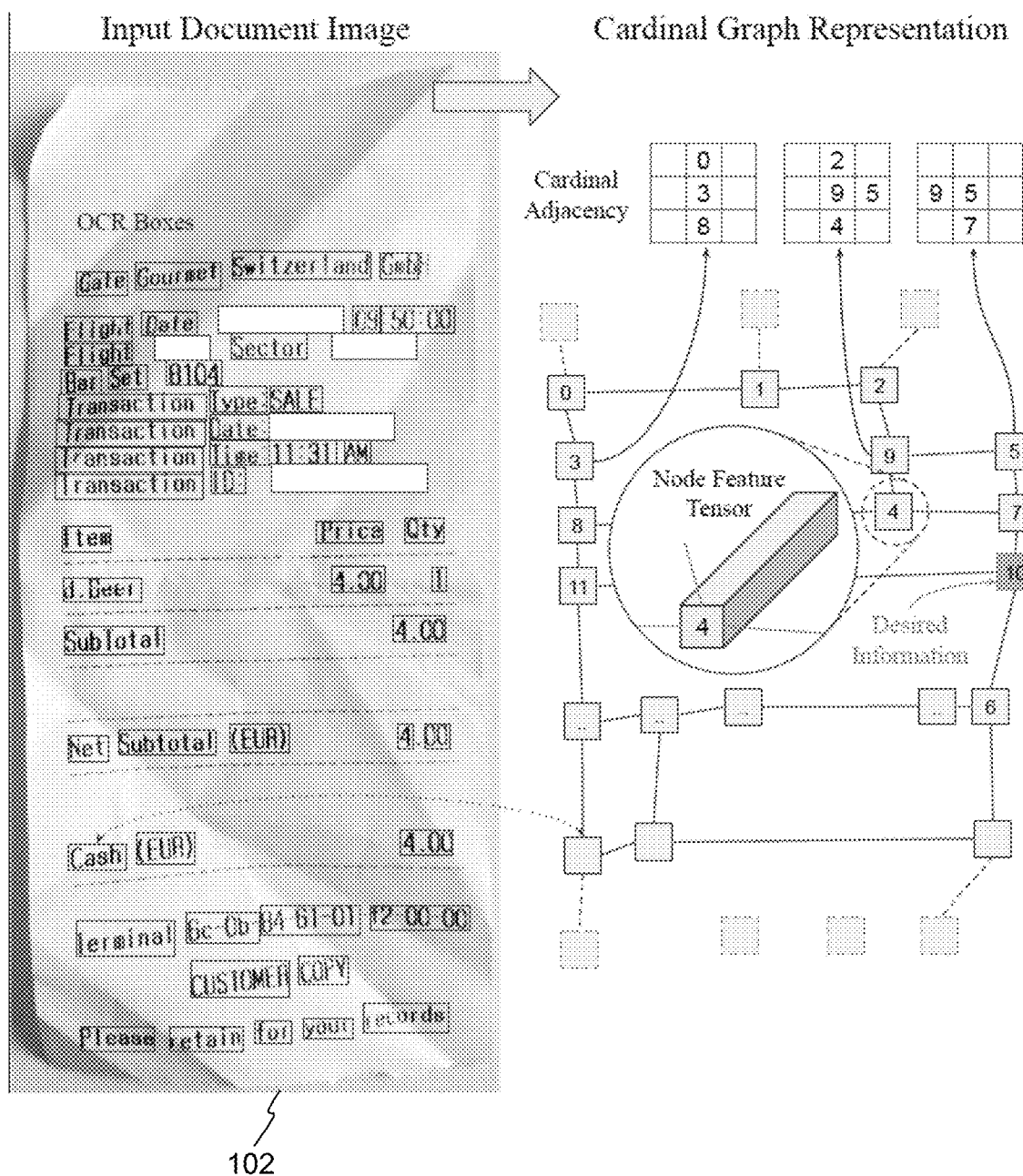
FIG. 1 represents a cardinal graph construction from noisy document input.

Aspects of the present disclosure relate to systems and methods for image-based document analysis using Graph Convolutional Networks (GCN) for processing pseudo-spatial graph representations of the underlying structure of documents.

Cardinal Graph Convolutional Networks (CGCN) are an efficient and flexible extension of GCNs with cardinal-direction awareness of spatial node arrangement, where before no such capability existed. The new mathematical formulation of CGCNs retains the traditional GCN permutation invariance, ensuring directional neighbors are intrinsically involved in learning abstract representations, even in the absence of a proper ordering of the nodes. CGCNs achieve state of the art results on an invoice information extraction task, jointly learning a wordlevel tagging as well as document meta-level regression problem. A new multi-scale Inception-like CGCN block-layer as well as Conv-Pool-DeConv-DePool UNetlike architecture are presented which increases the receptive field. The utility of CGCNs is presented with respect to several baseline models, such as sequential LSTM, non-cardinal GCNs, and an image-convolutional approach.

In various embodiments of the disclosure, one or more tasks as described herein may be performed by a data processor, such as a computing platform or distributed computing system for executing a plurality of instructions. Optionally, the data processor includes or accesses a volatile memory for storing instructions, data or the like. Additionally or alternatively, the data processor may access a non-volatile storage, for example, a magnetic hard-disk, flash-drive, removable media or the like, for storing instructions and/or data.

It is particularly noted that the systems and methods of the disclosure herein may not be limited in its application to the details of construction and the arrangement of the components or methods set forth in the description or illustrated in the drawings and examples. The systems and methods of the disclosure may be capable of other embodiments, or of being practiced and carried out in various ways and technologies.

Alternative methods and materials similar or equivalent to those described herein may be used in the practice or testing of embodiments of the disclosure. Nevertheless, particular methods and materials are described herein for illustrative purposes only. The materials, methods, and examples are not intended to be necessarily limiting.

Description of the Embodiments

The invention proposes a new extension to the GCN framework, named Cardinal Graph Convolutional Networks) CGCNs), wherein the graph representation of the document is built to retain knowledge of cardinal-direction relationships between nodes ('north-of', 'west-of', . . . ) and the network model itself is built to exploit such information. Furthermore, the CGCN framework is built to exploit graph-pooling methods, creating a fully convolutional-deconvolutional model and extending the receptive field of the network's filters. The CGCN model performance is evaluated on a canonical document analysis task—information extraction from invoices—and shows that it achieves superior results when compared state-of-the art LSTM, joint NLP-vision, and graph based algorithms.

Cardinal GCN (CGCN) Framework

Referring to FIG. 1 which represents a cardinal graph construction from noisy document input. Each word detected by the OCR in the original document (left) represents a single node on the graph (right). Edges are connected between neighbouring words in each of the four cardinal directions (up, down, left or right).

Figure 2:
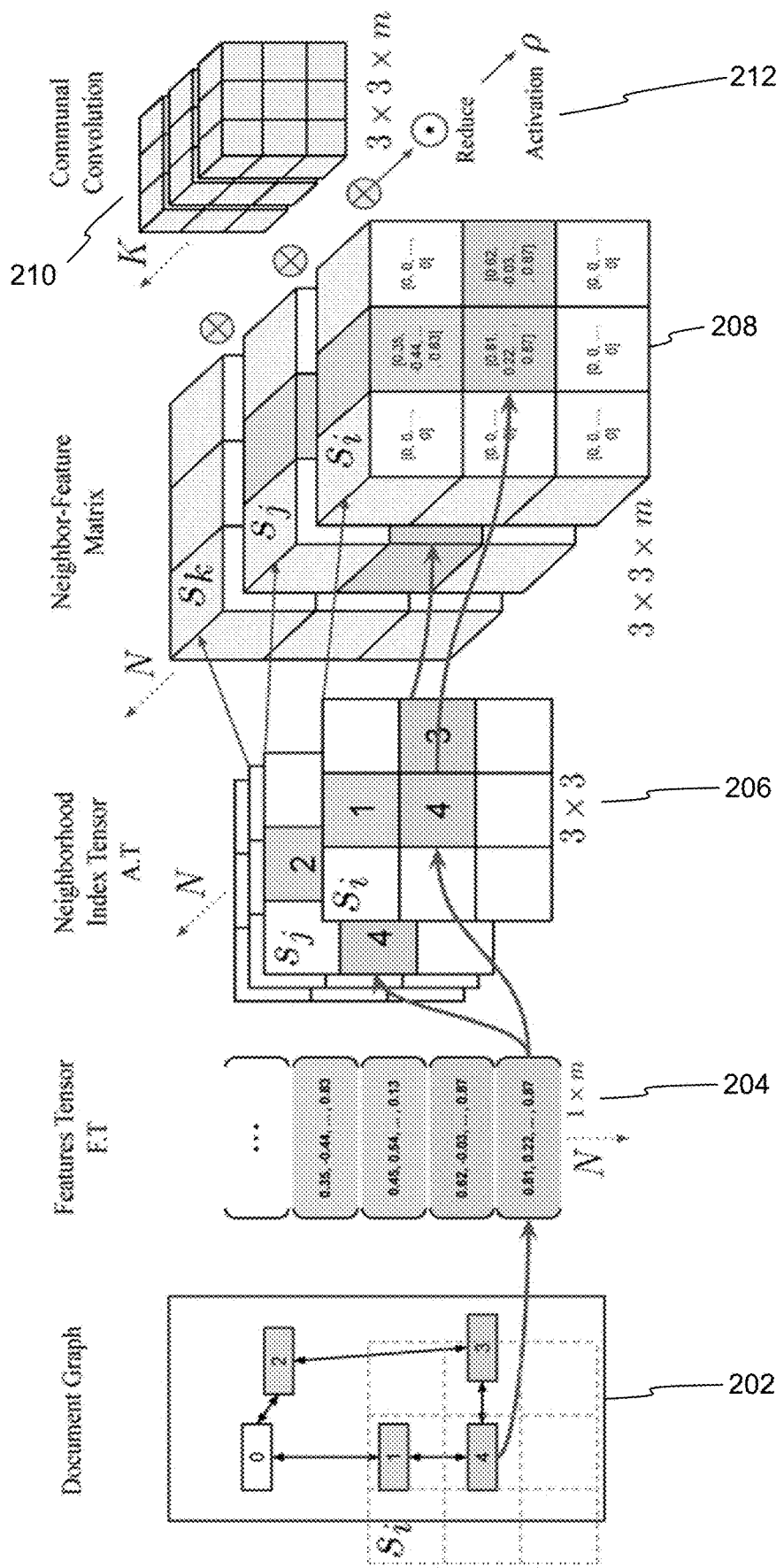
FIG. 2 represents a convolution operation in Cardinal Graph Convolutional Networks (CGCNs)

Referring to FIG. 2 which represents a convolution operation in Cardinal Graph Convolutional Networks (CGCNs). The cardinal graph representation 202 of the original document is prepared through OCR. In the Cardinal GCN (CGCN) framework, the adjacency matrix (A.M) is replaced with an adjacency tensor (A.T) 206, where the cardinal direction is encoded in a 3×3 neighborhood, e.g. 'Left', 'Right', 'Up', 'Down' and diagonals. The A.T of layer l is therefore of dimension: $n_l \times 3 \times 3$, where $n_l$ is the number of nodes in the layer. The entries of the tensor are the neighbor indices, rather than {0,1} adjacency indicators or [0, 1] weight such as in the A.M. Note that self connections are maintained using the center cell: $\forall_s: AT^{(l)}[s, 1,1]=s$.

For ease of implementation, the entries of the adjacency tensor are converted into one-hot encodings of the node indices. This one-hot adjacency tensor as $\widetilde{AT}$. The node-features tensor (F.T) 204 maintains its dimension: $n_l \times m$, where m is the features vector size. In addition, a connectivity weight tensor (C.W.T) is constructed which encodes a weighting over the graph edges, of dimension: $n_l \times 3 \times 3$. If an edge does not exist, for example if a node does not have a neighbour in the 'up' direction, the C.W.T entry in that direction is set to 0. One might use the C.W.T to also incorporate further spatial information such as geometric distance. The C.W.T is normalized: $\Sigma CWT=1$ as a regularization, following the same logic in eqn. (1). Graph operations on this representation are defined below.

Cardinal Convolutions

A neighbor-feature tensor 208 is created via an Einstein-summation over the node indices of the $\widetilde{AT}$'s 206 one-hot encoding and the node indices of the FT 204.

$$NFT_{i,j,k,l} = \sum_{a}^{n_l} \widetilde{AT}_{i,j,k,a} FT_{a,l} \quad (4)$$

The result is of dimension $n_l \times 3 \times 3 \times m$ where each $3 \times 3 \times m$ block is a local patch of the features in the neighbourhood of each node. The features in this patch are further scaled by multiplying them by the weights of the C.W.T. This local patch can then be convolved 210 with K learnable kernels of dimension $3 \times 3 \times m$ in $W^{(l)}$, in a similar manner to classical convolutional networks. The convolution operation 210 is finalized by reducing 212 the resulting $n_l \times 3 \times 3 \times K$ tensor into the new $n_l \times K$ feature tensor by selecting the center cell, the one corresponding to the node's self-link in the AT.

Following the vanilla GCN formulation, a generalization of eqn. (1) to the cardinal case is constructed as:

$$\text{Card}(AT, FT, CWT, W, \rho) = \odot((\widetilde{AT} \oplus FT \times CWT \otimes W)) \quad (5)$$

$$FT^{(l+1)} = AT^{(l)}, FT^{(l)}, CWT^{(l)}, W^{(l)}, \rho conv \quad (6)$$

where { $\widetilde{AT}^{(l)}$, $FT^{(l)}$, $CWT^{(l)}$ } are the adjacency, feature and connectivity weight tensors at layer l respectively, $\oplus$ is an Einstein summation:

$$R^{n_l \times 3 \times 3 \times n_l} \otimes R^{n_l \times m} \to R^{n_l \times 3 \times 3 \times m},$$

$\otimes$ is a convolution, $\circ$ is a Hadamard (element-wise) product, the $\odot$ operator reduces the $n_l \times 3 \times 3 \times K$ tensor to $n_l \times K$ by selecting the center cell and $\rho conv$ is the addition of bias and application of batch normalization and a LeakyReLU activation.

Transpose Convolutions

To take the transpose cardinal convolution $W^{(l)T} = T(W^{(l)})$ is defined, where:

$T(\bullet)$: $R^{K \times 3 \times 3 \times m} \to R^{m \times 3 \times 3 \times K}$, while $\{T\}$ remains unchanged and eqn. (6) holds.

Pooling

Figure 3:
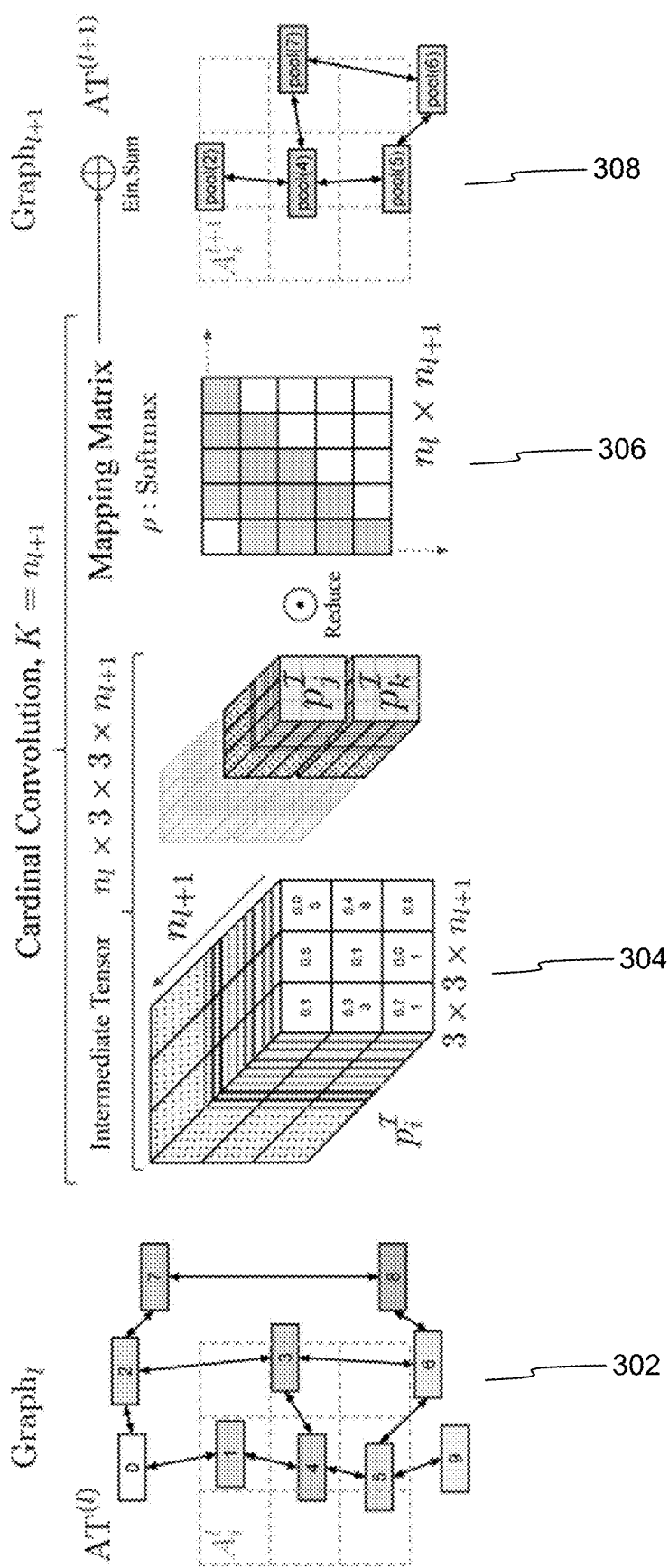
FIG. 3 represents a pooling operation in Cardinal Graph Convolutional Networks (CGCNs)

Referring to FIG. 3 which represents a pooling operation in Cardinal Graph Convolutional Networks (CGCNs). The pooling operation is defined in the CGCN framework following DiffPool (Ying et al., 2018), by reusing a cardinal convolution operation, eqn. (5), to learn the mapping M from layer l to l+1 using the node features:

$$M^{(l)} = \text{Card}(\{T\}^{(l)}, W_{map}^{(l)}, \rho_{map}, \quad (7)$$

where _map is the same as _conv, but using a Softmax activation. The convolution is used to learn $K = n_{l+1}$ filters. The resulting $n_{l+1}$ 'feature' entries for each node constitute a soft mapping from the node at layer l to the $n_{l+1}$ new nodes 304 at layer l+1. This mapping is used to converge features from multiple nodes into a single node, or to spread the features from one node amongst several new nodes. Using the cardinal convolution layer as above ensures that the pooling operation maintains awareness of the cardinal directions of neighbors while constructing the mapping. As in Diff-Pool (Ying et al., 2018), the same losses were applied to the mapping matrix to maintain spatial coherence. The mapping matrix 306 is used to obtain a set of pooled graph tensors, $\{T\}^{(l+1)}$ 308, via the following operations: $\widetilde{AT}^{(l+1)}$ is obtained by applying the mapping matrix twice to $\widetilde{AT}^{(l)}$ using Einstein summations. First the one-hot indices of the old neighbours are transformed into their position in the pooled graph, via:

$$\widetilde{AT}'^{(l)}_{i,j,k,m} = \sum_{a}^{n_l} \widetilde{AT}'^{(l)}_{i,j,k,a} M^{(l)}_{a,m}, \quad (8)$$

where $\widetilde{AT}'^{(l)}$ is the partially transformed $\widetilde{AT}$ of layer l and M is the mapping matrix. The same mapping is then applied to the node indices of the partially transformed AT, via:

$$\widetilde{AT}'^{(l+1)}_{n,j,k,m} = \sum_{i}^{n_l} \widetilde{AT}'^{(l)}_{i,j,k,m} M^{(l)}_{i,n}. \quad (9)$$

The result is a new adjacency tensor of dimension $n_{l+1} \times 3 \times 3 \times n_{l+1}$. The transformations of FT and CWT are conducted via a similar Einstein summation over the node indices:

$$FT^{(l+1)}_{i,j} = \sum_{a}^{n_l} FT^{(l)}_{a,j} M^{(l)}_{a,i}. \quad (10)$$

$$CWT^{(l+1)}_{i,j,k} = \sum_{a}^{n_l} CWT^{(l)}_{a,j,k} M^{(l)}_{a,i}. \quad (11)$$

Lemma 3.1. The cardinal pooling operation maintains permutation invariance1.

Maintaining permutation invariance allows to disregard any need for an a priori ordering of the nodes in the document graph.

Unpooling. Unpooling is performed using the same mapping matrix, M, used for the original pooling. The FT is restored to the original number of nodes by multiplying it by the mapping matrix: $M*FT$: $R^{n_l \times n_{l+1}} * R^{n_{l+1} \times m} \to R^{n_l \times m}$. The AT and CWT are unpooled by simply restoring them to their pre-pooling versions.

CGCN Inception Blocks

Figure 4C:
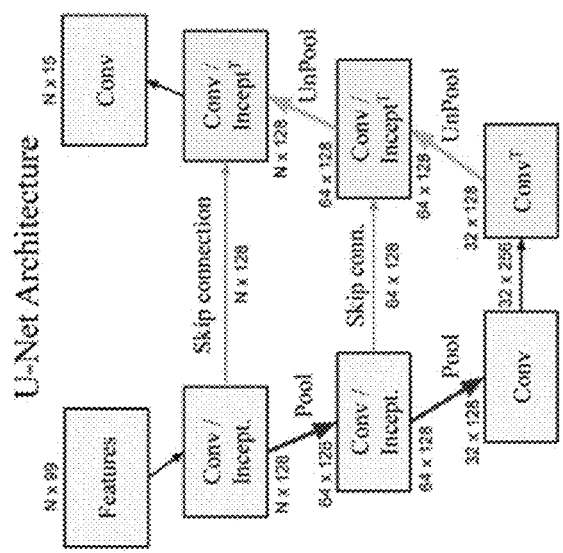
FIG. 4C represents illustration of the full network architecture.
Figure 4B:
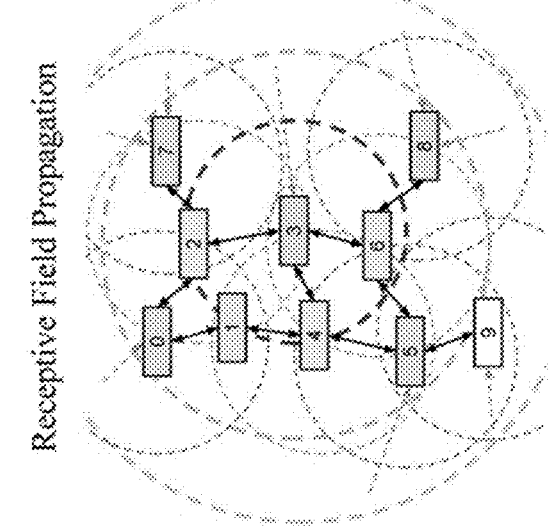
FIG. 4B represents illustration of the receptive field for repeated convolutions.
Figure 4A:
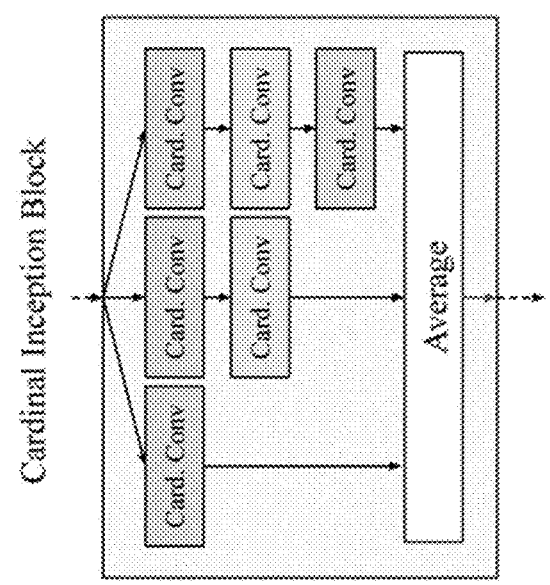
FIG. 4A represents the cardinal Inception block structure.

FIG. 4A represents the cardinal Inception block structure. The CGCN inception blocks are constructed aiming to simultaneously extract features at multiple scales from the graph. Whereas in the original Inception Network (Szegedy et al., 2015) the blocks are composed of several filters of different spatial sizes, in the case of graph convolutions it is not so simple to construct bigger neighbourhood regions. This issue stems from the lack of commutativity for neighbour hopping operations along the graph. For example, starting at the root node and going up followed by right, may not lead to the same node as first going right and then going up. In order to create higher scale operations, the basic 3×3 filters are instead chained, leading to the ability for features from further away along the graph to influence the current via the repeated convolutions. The inception blocks are thus constructed by a series of parallel paths, each leading through a different number of convolution steps, and averaging over the paths. When performing transposed convolutions, the convolutions within the block are simply replaced with transposed convolutions.

CGCN U-Net and Skip Connections

All of the above components are used to construct a U-Net-like (Ronneberger et al., 2015) encoder-decoder architecture as illustrated in FIG. 4B. The encoder begins with of a pair of inception blocks, each followed by a pooling step. Following the blocks is a step consisting of a single convolutional layer and another pooling step. The decoder takes the encoder's output and applies identical transpose convolution/unpooling operations in reversed order. Skip connections between the pooling and unpooling layers are also employed, where the result of any unpooling operation is concatenated with the input of the matching pooling layer. Following the final decoder layer, a single convolutional layer is applied where the number of output features is the number of node classes, and use a softmax activation. The resulting feature tensor is the perclass confidence level for each node.

Document-Level Predictions

In addition to the increased receptive field offered by the encoder-decoder architecture, the pooling of graph features makes it simpler to extract a classification for the entire document graph. To that end, the encoder's output is passed through a final pooling layer, the results averaged over all graph nodes and the resulting feature vector is pushed through a fully connected layer, with a soft max activation. Three such graph-level prediction layers are applied: one for determining the document's origin country, one for determining the currency and one for determining the document's expense type (e.g. 'Train' or 'Hotel').

Training

In order to train the model, two losses are defined. The first is a node-level loss LN defined as a weight-averaged cross-entropy for individual node class predictions, where the weighting is set to 1 for any node belonging to the background, and 10 for any node with a non-background label. The second loss is a graph-level loss LG defined as the sum of cross-entropy losses for each of the desired graph-level predictions. Additionally, DiffPool is followed in minimizing the Frobenius inner-product and the entropy loss over the pooling mapping matrices. The full loss function is therefore given by:

$$\mathcal{L} = \mathcal{L}_N + \lambda_G \mathcal{L}_G + \lambda_E \mathcal{L}_E + \lambda_{LP} \mathcal{L}_{LP}, \quad (12)$$

where the $\lambda$ are parameters to be determined through hyperparameter tuning. In practice, the setting $\lambda\_E=\lambda\_LP=1:0$ and $\lambda\_G=0:0$ is found to offer the best results. The experimental justification for the choice of $\lambda\_G$ and a discussion on the matter are discussed below.

The network is trained for 60 epochs using an Adam optimizer with a learning rate of 0.01 and a batch size of 50 documents.

Experiments

The performance of CGCNs is evaluated by applying it to the task of invoice information retrieval and comparing it to several baselines, including an NLP-based LSTM approach, a regular GCN with no directionality information, and a model using joint visual and linguistic inputs. An ablation study is further conducted in order to evaluate the benefits of each suggested modification: Inception-like layers, pooling, and the addition of document-level predictions.

Dataset

All experiments are conducted using a dataset of 6512 phone-captured invoice images. The dataset was split into training, validation and test sets using a 0.8:0.1:0.1 ratio. Each image is preprocessed using the same set of algorithms, including: segmentation of the invoice from the background, perspective corrections, skew corrections and binarization. No correction is applied to local, non-linear perturbations, such as creases and folds. The images are turned into localized textual data (in hOCR format) using the Tesseract OCR engine (Smith, 2007). Due to the high error rate of the engine on reading such images (35% at the word level), all invoices in the set were chosen such that the correct invoice amount can be obtained from at least one concatenation of up to 3 strings in the hOCR results, followed by simple non-digit to digit replacement corrections such as changing 'o' and 'O' for '0's. For each invoice word a fixed set of features were extracted, including a character-based word embedding (Gal et al., 2018) and a set of formatting and location-based features. The same word-features are used as an input to all experiments. The annotations for each invoice are comprised of a bounding rectangle drawn over each word that matches one of the classes. These annotations are translated to the text level, using an IOB scheme similar to (Ramshaw and Marcus, 1995). For each bounding box of class (class), the left-most string detected by the OCR was marked within the bounding box as B-(class) ('begin'), each following string as I-(class) ('inside') and O ('outside') for any string that is not contained in any annotated box. For example, the words in "inkl. MwSt. 7% 0.39" would be annotated as "B-VatLabel, I-VatLabel, O, B-VatAmount, I-VatAmount". Each model was in turn trained to provide a classification for each word in the document.

4.2 Baselines

The baseline models used in the experimental comparisons are as follows:

Sequential LSTM model—following (Palm et al., 2017), a sequential LSTM model was implemented. Differences from their implementation are in the use of the set of word features and in the use of a different set of hyper parameters, determined through cross validation on the data set.

Joint visual-linguistic model—following (Gal et al., 2018), a model was used that jointly learns visual and linguistic features from the image, and turn the resulting heat-maps into a perclass score for each word using an MLP with a softmax activation (in lieu of the suggested 'inverse softmax' best-candidate-choice).

GCN—A vanilla GCN implementation without pooling or inception-like blocks.

Ablation Studies

Ablation studies were conducted in order to investigate the benefits of various proposed extensions of the graph network, including the following models:

CGCN-Full—The full model, making use of the directional-neighbour representation, the proposed graph convolutional and pooling layers, and the inception-like blocks.

CGCN-NoPool—As per the full model, but not making use of any pooling layers.

CGCN-DirOnly—As per the full model, but not making use of any pooling layers or inceptionlike blocks.

CGCN-WithMeta—The full model, but trained using $\lambda_G=1:0$.

Results

The various experiments were compared using the F1 metric for each IOB class. The results are shown in table 1 of FIG. 5. It is firstly noted that the CGCN model outperforms the other baselines for nearly every field and comes at a close second for all other instances. Furthermore, it is noted that the wide performance gap between methods which make use of directional information (LSTM, Visual, CGCN) and the one that does not (GCN), especially when dealing with the more difficult 'inside' labels. The results of the ablation studies indicate that the inclusion of pooling operations and inception-like blocks provides an improvement in most cases. However, for some fields the performance worsened after adding these steps. One reason for this drop may be that many such 'worsened fields' are often composed of a mix of both linguistic and numeric words, which are sufficiently different in the feature space that they do not get joined in the pooling operations. Examples of this can be found in dates ("3 Mar. 2018"), or VAT Ids ("DE 814949420").

Another result worth noting is that the model which contains the addition of document-level predictions leads to worse performance in almost all metrics. While the extra predictions add another level of supervision and reduce the model's tendency to get stuck in spurious minimas, they seem to have too much of an influence on the dominant nodes during the pooling operations. An intuitive reasoning for this may lie in the fact that the words more relevant for predicting, for example, the document's expense type ('Hotel', 'Restaurant'), tend to be different than the words that comprise the document fields aimed to be extracted.

While the F1 measure is oft used for comparisons in the field, there remains a non-negligible amount of recent papers that make use of their own unique metrics for comparisons. In order to facilitate a greater ease of comparison to past works, the results are also provided for baseline comparison using an accuracy metric. The prediction accuracy was calculated for four fields, chosen because they have a single correct value for the invoice, even if they appear multiple times. A prediction for an invoice is considered correct if the string with the highest confidence for a given field, created from concatenating sequential begin and inside labels (while averaging over their confidence scores), has the same value as the human annotation for that field. An accuracy score normalized to account only for invoices was also provided where the OCR was able to successfully read all four fields. These accuracy measures are provided in table 2 of FIG. 6. The CGCN remains the top performer under this metric, though it is interesting to note that the noncardinal GCN is not quite as far behind as it is when using the F1 measure. This situation arises because under this accuracy metric, it is sufficient for the model to correctly detect a single instance of each class, even if it fails in detecting all other instances. The LSTM based model, meanwhile, appears to perform worse. This is because the confidence metrics it delivers have less variance, and there is a reasonable chance for a misread field to be the top scoring one.

CONCLUSION

Directional information is key to extracting meaningful information from documents, where the spatial layout confers additional knowledge about the semantic meaning of words. An extension of the GCN framework is proposed which is capable of leveraging such directional information and have shown that it is capable of achieving state-of-the-art performance on the task of invoice field extraction. While the idea of jointly learning both a word-level and a document-level classification at the same time has not shown success, it is believed that there is still room for future work in improving on this multi-scale classification task. Other interesting avenues for further research may be the use of a similar model for additional tasks, such as website scraping or information extraction from infographics, or the incorporation of nonlinguistic elements into the graph.

Figure 7:
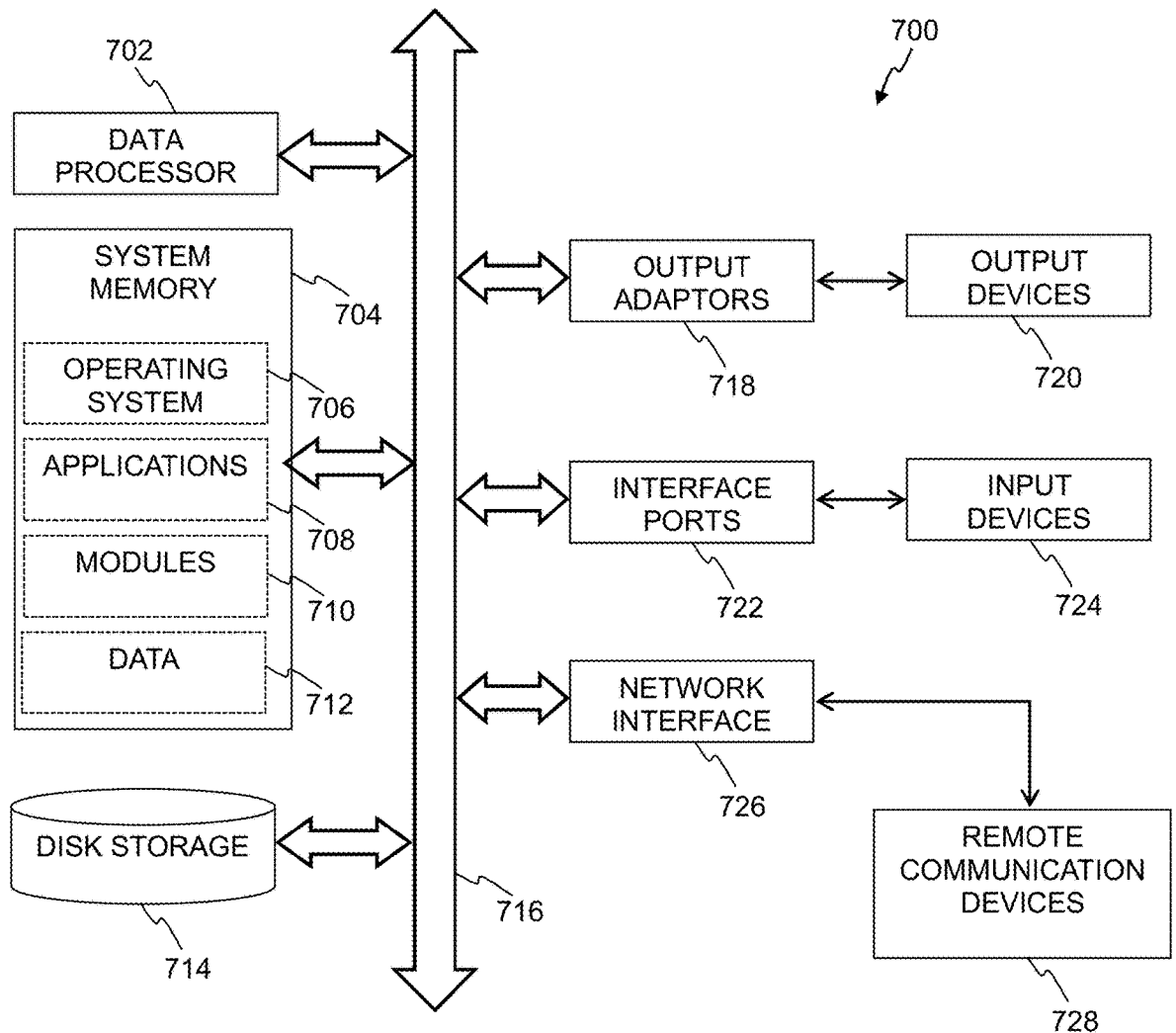
FIG. 7 is a block diagram of an exemplary system that can be employed in accordance with the invention.

FIG. 7 illustrates an exemplary system 700 for implementing various aspects of the invention. The system 700 includes a data processor 702, a system memory 704, and a system bus 716. The system bus 716 couples system components including, but not limited to, the system memory 704 to the data processor 702. The data processor 702 can be any of various available processors. The data processor 702 refers to any integrated circuit or other electronic device (or collection of devices) capable of performing an operation on at least one instruction, including, without limitation, Reduced Instruction Set Core (RISC) processors, CISC microprocessors, Microcontroller Units (MCUs), CISC-based Central Processing Units (CPUs), and Digital Signal Processors (DSPs). Furthermore, various functional aspects of the data processor 702 may be implemented solely as software or firmware associated with the processor. Dual microprocessors and other multiprocessor architectures also can be employed as the data processor 702.

The system bus 716 can be any of several types of bus structure(s) including the memory bus or memory controller, a peripheral bus or external bus, and/or a local bus using any variety of available bus architectures known to those of ordinary skill in the art.

The system memory 704 may include computer-readable storage media comprising volatile memory and nonvolatile memory. The non-volatile memory stores the basic input/output system (BIOS), containing the basic routines to transfer information between elements within the system 700. The nonvolatile memory can include, but not limited to, read only memory (ROM), programmable ROM (PROM), electrically programmable ROM (EPROM), electrically erasable programmable ROM (EEPROM), or flash memory. The volatile memory includes random access memory (RAM), which acts as external cache memory. RAM is available in many forms such as static RAM (SRAM), dynamic RAM (DRAM), synchronous DRAM (SDRAM), double data rate SDRAM (DDR SDRAM), enhanced SDRAM (ESDRAM), SynchLink™ DRAM (SLDRAM), Rambus® direct RAM (RDRAM), direct Rambus® dynamic RAM (DRDRAM), and Rambus® dynamic RAM (RDRAM).

The system memory 704 includes an operating system 706 which performs the functionality of managing the system 700 resources, establishing user interfaces, and executing and providing services for applications software. The system applications 708, modules 710 and data 712 provide various functionalities to the system 700.

The system 700 also includes a disk storage 714. Disk storage 14 includes, but is not limited to, devices like a magnetic disk drive, floppy disk drive, tape drive, Jaz drive, Zip drive, LS-100 drive, flash memory card, or memory stick. In addition, disk storage 714 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM).

A user enters commands or information into the system 700 through input device(s) 724. Input devices 724 include, but are not limited to, a pointing device (such as a mouse, trackball, stylus, or the like), a keyboard, a microphone, a joystick, a satellite dish, a scanner, a TV tuner card, a digital camera, a digital video camera, a web camera, and/or the like. The input devices 724 connect to the data processor 702 through the system bus 716 via interface port(s) 722. Interface port(s) 722 include, for example, a serial port, a parallel port, a game port, and a universal serial bus (USB).

The output devices 720 like monitors, speakers, and printers are used to provide output of the data processor 702 to the user. Another example, a USB port may be used as an input device 724 to provide input to the system 700 and to output information from system 700 to the output device 720. The output devices 720 connect to the data processor 702 through the system bus 716 via output adaptors 718. The output adapters 732 may include, for example, video and sound cards that provide a means of connection between the output device 720 and the system bus 716.

The system 700 can communicate with remote communication devices 728 for exchanging information. The remote communication device 728 can be a personal computer, a server, a router, a network PC, a workstation, a microprocessor based appliance, a mobile phone, a peer device or other common network node and the like.

Network interface 726 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

What is claimed is:

1. A document analysis system configured to process a document (102) based on a cardinal graph convolution network (CGCN), the document analysis system comprising:
    an automatic document analyzer configured to generate a cardinal graph representation (202) of the document, wherein in the cardinal graph representation each word in the document is represented as a single node on a graph and edges are connected between neighbouring nodes in four cardinal directions;
    a feature-harvesting agent configured to generate a features tensor (F.T) (204) for each node of the cardinal graph representation, the features tensor having a dimension of n×m, where n is the number of nodes in the cardinal graph representation and m is the features vector size;
    a neighbourhood analyzer configured to:
    encode the cardinal directions in a 3×3 neighborhood to generate an adjacency tensor (A.T) (206) having node neighbour indices, the adjacency tensor (A.T) having a dimension of $n_l \times 3 \times 3$, where l is the number of layers in the (A.T) $n_l$ is the number of nodes in the layer;
    transform the entries of the adjacency tensor (A.T) into a one-hot encoding $\widetilde{AT}$ of the node neighbour indices;
    create a neighbourhood feature tensor (NFT) (208) through an Einstein-summation over the node indices of the $\widetilde{AT}$'s (206) one-hot encoding and the node indices of the features tensor (F.T) (204) using the equation:

$$NFT_{i,j,k,l} = \sum_a^{n_l} \widetilde{AT}_{i,j,k,a} FT_{a,l},$$

wherein neighbourhood feature tensor (NFT) having a dimension of $n_l \times 3 \times 3 \times m$ where each 3×3×m block is a local patch of features in the neighbourhood of each node;
    a feature-tensor generation agent configured to:
    scale the features in each block by multiplying them with a connectivity weight tensor (C.W.T), wherein the connectivity weight tensor (C.W.T) encodes a weighting over the adjacency tensor (A.T) edges;
    convolve (210) the scaled features in each block with K learnable kernels of dimension 3×3×m in W(l) resulting in a convolved tensor of $n_l \times 3 \times 3 \times K$ dimension; and
    reduce (212) the convolved tensor into a new feature tensor of dimension $n_l \times K$ by selecting a center cell of the convolved tensor, wherein the center cell corresponds to a node's self-link in the adjacency tensor (A.T).

2. The document analysis system of claim 1, wherein the automatic document analyzer is configured to generate a cardinal graph representation of the document using Optical character recognition (OCR) module.

3. The document analysis system of claim 1, further comprising a pooling agent configured to use a pooling operation to change the size of a graph by reusing a cardinal convolution operation to learn mapping from layer l to l+1 of the adjacency tensor (A.T) (206) using the node features:

$$M^{(l)} = \text{Card}(\{T\}^{(l)}, W_{map}^{(l)}, \rho_{map}),$$

4. The document analysis system of claim 3, wherein _map is similar to _conv using a Softmax activation.

5. The document analysis system of claim 3, wherein the pooling agent is further configured to learn $K = n_{l+1}$ filters using the cardinal convolution.

6. The document analysis system of claim 3 wherein the pooling agent further comprises a memory module and is further configured to generate a set of pooled graph adjacency tensors $\widetilde{AT}^{(l+1)}$ (308), by executed code stored upon the memory module, said code directed to executing the steps:
    transforming the one-hot encoding $\widetilde{AT}$ of the node neighbour indices into their position in the pooled graph using the equation:

$$\widetilde{AT}'^{(l)}_{i,j,k,m} = \sum_a^{n_l} \widetilde{AT}_{i,j,k,a} M^{(l)}_{a,m}$$

where $AT'^{(l)}$ is the partially transformed $\widetilde{AT}$ of layer l and M is the mapping matrix (306); applying the same mapping M to the node indices of $\widetilde{AT}$ using the equation:

$$\widetilde{AT}'^{(l+1)}_{n,j,k,m} = \sum_{i}^{n_l} \widetilde{AT}'^{(l)}_{i,j,k,m} M^{(l)}_{i,n}$$

wherein the resulting new adjacency tensor is of dimension $n_{l+1} \times 3 \times 3 \times n_{l+1}$.

7. The document analysis system of claim 3, wherein the pooling agent is further configured to generate pooled graph features tensors $FT^{(l+1)}$ using the equation:

$$FT^{(l+1)}_{i,j} = \sum_{a}^{n_l} FT^{(l)}_{a,j} M^{(l)}_{a,i}.$$

8. The document analysis system of claim 7, wherein the pooling agent is further configured to restore the feature tensor (F.T) (204) to the original number of nodes using a unpooling operation by multiplying the feature tensor (F.T) with the mapping matrix M (306) using the equation:

$$M * FT: R^{n_l \times n_{l+1}} * R^{n_{l+1} \times m} \to R^{n_l \times m}.$$

9. The document analysis system of claim 3, wherein the pooling agent is further configured to generate pooled graph connectivity weight tensor $CWT^{(l+1)}$ using the equation:

$$CWT^{(l+1)}_{i,j,k} = \sum_{a}^{n_l} CWT^{(l)}_{a,j,k} M^{(l)}_{a,i}.$$

\* \* \* \* \*